(12) United States Patent
Yoshida et al.

(10) Patent No.: US 11,282,521 B2
(45) Date of Patent: Mar. 22, 2022

(54) DIALOG SYSTEM AND DIALOG METHOD

(71) Applicant: Kabushiki Kaisha Toshiba, Tokyo (JP)

(72) Inventors: Takami Yoshida, Kamakura Kanagawa (JP); Hiroshi Fujimura, Yokohama Kanagawa (JP); Kenji Iwata, Machida Tokyo (JP); Yuka Kobayashi, Seto Aichi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 173 days.

(21) Appl. No.: 16/565,239

(22) Filed: Sep. 9, 2019

(65) Prior Publication Data

US 2020/0243082 A1    Jul. 30, 2020

(30) Foreign Application Priority Data

Jan. 30, 2019    (JP) .............................. JP2019-014417

(51) Int. Cl.
| | |
|---|---|
| *G06F 16/332* | (2019.01) |
| *G10L 15/22* | (2006.01) |
| *G10L 15/08* | (2006.01) |
| *G06F 16/245* | (2019.01) |
| *G06F 40/30* | (2020.01) |

(52) U.S. Cl.
CPC ............ *G10L 15/22* (2013.01); *G06F 16/245* (2019.01); *G10L 15/08* (2013.01); *G06F 16/3329* (2019.01); *G06F 40/30* (2020.01); *G10L 2015/088* (2013.01); *G10L 2015/223* (2013.01)

(58) Field of Classification Search
CPC .............................. G06F 40/30; G06F 16/3329
See application file for complete search history.

(56) References Cited

U.S. PATENT DOCUMENTS 9,471,668 B1 * 10/2016 Alupului ................ G06N 3/006
2005/0240413 A1    10/2005 Asano et al.
(Continued)

FOREIGN PATENT DOCUMENTS

| JP | 2005-301780 A | 10/2005 |
| JP | 2005-352534 A | 12/2005 |

(Continued)

*Primary Examiner* — Feng-Tzer Tzeng
(74) *Attorney, Agent, or Firm* — Knobbe, Martens, Olson & Bear LLP

(57) ABSTRACT

According to one embodiment, a dialog system includes a processor. When a first sentence including one or more words is input by a user, the processor sets at least a part of the one or more words as a first query keyword. The processor selects, from a question-answer table including question-answer pairs, one or more of the question-answer pairs including the first query keyword. Each question-answer pair includes a question and an answer to the question. When a number of the selected question-answer pairs is 1, the processor outputs a first response indicating the answer. When the number is not less than a first threshold, the processor outputs a second response including first and second question keywords. The first question keyword is extracted from question keywords included in one of the pairs. The second question keyword is extracted from other question keywords included in another one of the pairs.

7 Claims, 11 Drawing Sheets

(56) References Cited

U.S. PATENT DOCUMENTS

| | | | | |
|---|---|---|---|---|
| 2013/0029307 A1* | 1/2013 | Ni | ................... | G06N 20/00 |
| | | | | 434/322 |
| 2016/0171560 A1* | 6/2016 | Roy | ................ | H04L 51/063 |
| | | | | 705/14.67 |
| 2020/0143792 A1* | 5/2020 | Iwata | ............. | G06F 16/3329 |

FOREIGN PATENT DOCUMENTS

| | | |
|---|---|---|
| JP | 2012-248161 | 12/2012 |
| JP | 2019-003319 A | 1/2019 |
| JP | 2020-77159 A | 5/2020 |

\* cited by examiner

FIG. 2

| ID | QUESTION | ANSWER | KEYWORD | |
|---|---|---|---|---|
| a ~111a | I'D LIKE BALANCE CONFIRMATION OF A SAVINGS ACCOUNT ~112a | TO CONFIRM YOUR BALANCE, ... ~113a | SAVINGS ACCOUNT, BALANCE CONFIRMATION ~114a | ← 110a |
| b ~111b | I'D LIKE TO APPLY FOR A SAVINGS ACCOUNT ~112b | TO APPLY FOR AN ACCOUNT, ... ~113b | SAVINGS ACCOUNT, APPLY ~114b | ← 110b |
| c ~111c | I'D LIKE TO CLOSE A SAVINGS ACCOUNT ~112c | TO CLOSE AN ACCOUNT, ... ~113c | SAVINGS ACCOUNT, CLOSE ~114c | ← 110c |
| ... | ... | ... | ... | |
| k ~111K | I'D LIKE TO APPLY FOR A LOAN ~112K | APPLICATIONS ARE DIFFERENT ACCORDING TO THE LOAN TYPE. FOR A HOUSING LOAN, ... ~113K | LOAN, APPLY ~114K | ← 110K |

| ANSWER CANDIDATE NUMBER | SCENARIO TEMPLATE |
|---|---|
| 0 | "I'M SORRY. AN ANSWER CANDIDATE WAS NOT FOUND." |
| 1 | "YOUR QUESTION IS BLANK 1.  BLANK 2" |
| NOT LESS THAN 2 BUT LESS THAN Ns | "IS YOUR QUESTION BLANK 3a? BLANK 3b? … BLANK 3Ns?" |
| NOT LESS THAN Ns | "ARE THERE ADDITIONAL KEYWORDS SUCH AS BLANK 4a, BLANK 4b, …, BLANK 4Nk, OR THE LIKE?" |

FIG. 4

| KEYWORD | TASK SCENARIO |
|---|---|
| BALANCE CONFIRMATION | "YOUR QUESTION IS 'I'D LIKE BALANCE CONFIRMATION OF A SAVINGS ACCOUNT.' FOR BALANCE CONFIRMATION, ..." —131 |
| APPLY | "IS YOUR QUESTION, 'I'D LIKE TO APPLY FOR A SAVINGS ACCOUNT?' IS IT 'I'D LIKE TO APPLY FOR A LOAN?'" —132 |
| SAVINGS ACCOUNT | "ARE THERE ADDITIONAL KEYWORDS SUCH AS 'BALANCE CONFIRMATION,' 'APPLY,' 'CLOSE,' OR THE LIKE?" —133 |

FIG. 13

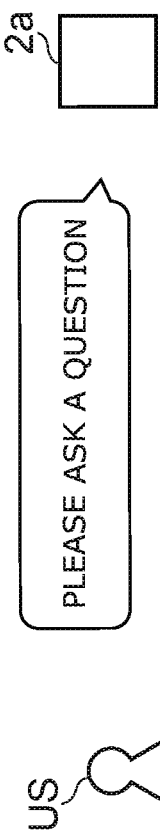

PLEASE ASK A QUESTION

CAN I TRANSFER MONEY OVERSEAS BY INTERNET BANKING?

| ID | QUESTION | ANSWER | KEYWORD |
|---|---|---|---|
| A | I'D LIKE TO TRANSFER MONEY TO A FOREIGN BANK | TO TRANSFER MONEY TO A FOREIGN COUNTRY, ... | TRANSFER MONEY |
| B | I'D LIKE TO APPLY FOR INTERNET BANKING | TO APPLY, ... | INTERNET BANKING |
| C | CAN I CREATE AN ACCOUNT FROM INTERNET BANKING? | TO OPEN AN ACCOUNT, ... | INTERNET BANKING |
| D | CAN I OPEN AN ACCOUNT EVEN IF I LIVE OVERSEAS? | I'M SORRY ... | OVERSEAS |
| E | CAN I WITHDRAW MONEY OVERSEAS? | TO WITHDRAW, ... | OVERSEAS |
| F | CAN I USE A CREDIT CARD OVERSEAS? | CREDIT CARDS ... | OVERSEAS |

| RANK | TASK SCENARIO | MATCHING KEYWORD AND SCORE |
|---|---|---|
| 1 | "YOUR QUESTION IS, 'I'D LIKE TO TRANSFER MONEY TO A FOREIGN BANK.' TO TRANSFER MONEY TO A FOREIGN COUNTRY, ..." | TRANSFER MONEY (6) |
| 2 | "IS YOUR QUESTION, 'I'D LIKE TO APPLY FOR INTERNET BANKING?' IS IT 'CAN I OPEN AN ACCOUNT FROM INTERNET BANKING?'" | INTERNET BANKING (3) |
| 3 | "ARE THERE ADDITIONAL KEYWORDS SUCH AS OPEN AN ACCOUNT, WITHDRAW, CREDIT CARD, OR THE LIKE?" | OVERSEAS (2) |

…

DIALOG SYSTEM AND DIALOG METHOD

CROSS-REFERENCE TO RELATED APPLICATIONS

This application is based upon and claims the benefit of priority from Japanese Patent Application No. 2019-014417, filed on Jan. 30, 2019; the entire contents of which are incorporated herein by reference.

FIELD

Embodiments described herein relate generally to a dialog system and a dialog method.

BACKGROUND

A dialog system uses a dialog with a user to output an answer to an inquiry from the user. It is desirable to develop technology to configure such a dialog system more easily.

BRIEF DESCRIPTION OF THE DRAWINGS

FIG. 2 is a table illustrating a question-answer table;

FIG. 3 is a table illustrating scenario templates;

FIG. 4 is a table illustrating task scenarios;

FIG. 13 is a schematic view describing the operation of the dialog system according to the second embodiment.

DETAILED DESCRIPTION

Figure 1:
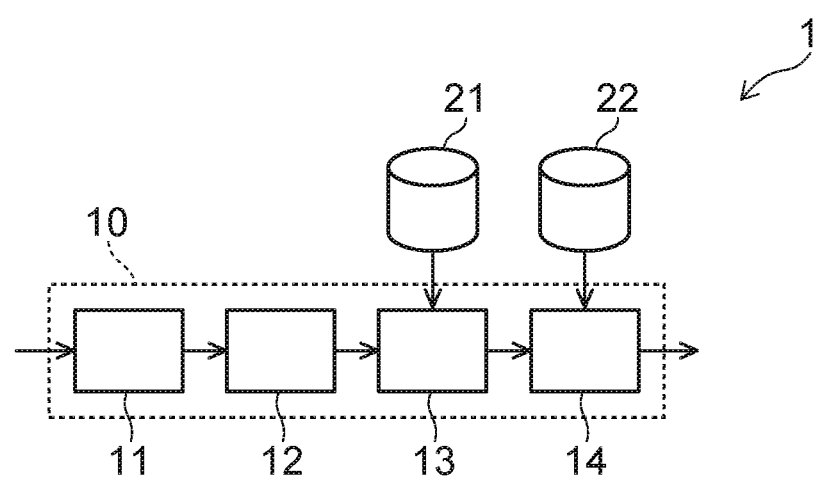
FIG. 1 is a schematic view illustrating a dialog system according to a first embodiment.

According to one embodiment, a dialog system includes a processor. When a first sentence including one or more words is input by a user, the processor sets at least a part of the one or more words as a first query keyword. The processor selects, from a question-answer table including a plurality of question-answer pairs, one or more of the question-answer pairs including the first query keyword. Each question-answer pair includes a question and an answer to the question. When a number of the selected question-answer pairs is 1, the processor outputs a first response indicating the answer included in the selected question-answer pair. When the number is not less than a first threshold, the processor outputs a second response including a first question keyword and a second question keyword. The first question keyword is extracted from a plurality of question keywords included in one of the selected question-answer pairs. The second question keyword is extracted from another plurality of question keywords included in another one of the selected question-answer pairs.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic view illustrating a dialog system according to a first embodiment.

As shown in FIG. 1, the dialog system 1 according to the first embodiment includes a processor 10. In the example shown in FIG. 1, the dialog system 1 further includes a first memory 21 and a second memory 22.

The processor 10 accepts a sentence input from a user. The processor 10 outputs a response for the input sentence. Based on the response from the processor 10, the user inputs the next sentence to the processor 10. The processor 10 outputs a response to the next sentence based on the dialog with the user up to that point. Thereby, a dialog is realized between the user and the dialog system 1.

The first memory 21 stores a question-answer table. The question-answer table includes multiple question-answer pairs. Each question-answer pair includes a question, and an answer to the question. The second memory 22 stores generic scenarios for generating the response output from the processor 10. The processor 10 generates the response to the input sentence while referring to the first memory 21 and the second memory 22.

For example, the sentence that is input from the user includes an inquiry. Here, the sentence that is input from the user to the processor 10 is called a "query sentence." When accepting the query sentence, the processor 10 refers to the question-answer table of the first memory 21. The processor 10 verifies whether or not a question associated with the query sentence is in the question-answer table. When an associated question is found, the processor 10 outputs, to the user, a response indicating the answer to the question.

When there are multiple associated questions, the processor 10 outputs a response (a re-inquiry) for narrowing down to one question. From the response, the user inputs another query sentence including information (a keyword) for narrowing down the question. For example, the input of the query sentence by the user and the response from the processor 10 are repeated alternately until the questions are narrowed down to one. By answering the responses of the dialog system, the user can arrive at one answer including the information sought by the user. By using the dialog system 1, the user obtains one answer even when the user does not know an appropriate search method.

Scenarios are necessary to output responses based on the query sentences from the dialog system to the user. A conceptual dictionary may be used to automatically generate the scenarios. The conceptual dictionary includes, for example, attributes, attribute values, and paraphrases. In a dialog system that uses a conceptual dictionary, the processor automatically generates a scenario based on the conceptual dictionary and the number of answer candidates when a query sentence is input. Due to the automatic generation of the scenarios, it is unnecessary for a human (e.g., a system administrator) to generate the scenarios.

On the other hand, to use the conceptual dictionary, it is necessary for the system administrator to assign one or more attributes and the attribute value of each attribute for all of the questions included in the question-answer table. When the conceptual dictionary is used, the time that is necessary to generate the scenarios can be reduced; but time is necessary to generate the conceptual dictionary. Also, what is used as the attributes and the attribute values is dependent on the system administrator. It is also necessary to determine the method for determining whether or not an attribute value is mentioned in the inquiry of the user. Accordingly, the system administrator must have expertise; and the burden on the system administrator is large.

Therefore, it is desirable to develop technology that can more easily configure a dialog system capable of a dialog with a user.

In the dialog system 1 according to the embodiment, the processor 10 sets, as a keyword (a query keyword), at least a part of one or more words included in a query sentence from the user when the query sentence is input. The processor 10 selects question-answer pairs including the query keyword from the question-answer table. By using the query keyword when selecting, preparation such as assigning attributes and attribute values to the question-answer table is unnecessary.

When the number of selected question-answer pairs is 1, the processor 10 outputs a first response indicating the answer of the one question-answer pair. For example, the first response includes the question and the answer included in the selected question-answer pair. The first response may include a webpage URL where the answer is recited. The user can confirm the answer for the inquiry by referring to the first response.

When the number of selected question-answer pairs is 2 or more, the processor 10 outputs a second response. The second response includes a question keyword extracted from multiple keywords (question keywords) included in one of the selected question-answer pairs and another question keyword extracted from other multiple question keywords included in another one of the selected question-answer pairs. These question keywords that are included in the second response are different from the query keyword. By referring to the second response, the user can know what kind of keyword to include in the next query sentence to narrow down the question-answer pair.

A scenario that corresponds to the number of selected question-answer pairs described above can be generated automatically using a generic dictionary. Therefore, the burden of the scenarios needing to be generated by the system administrator can be reduced.

For example, the user inputs, to the processor 10, another query sentence including one of the question keywords included in the second response. The processor 10 sets, as another query keyword, at least a part of one or more words included in the other query sentence. By using the other query keyword, the processor 10 further selects a part of the selected two or more question-answer pairs. As a result, when the number of selected question-answer pairs is 1, the processor 10 outputs the first response. When the number of selected question-answer pairs is 2 or more, the processor 10 re-outputs the second response.

According to the embodiment, for example, the dialog with the user for the question-answer table can be realized without using a conceptual dictionary. Also, according to the embodiment, a response that includes question keywords is displayed when two or more question-answer pairs are selected. Thereby, the user can know what kind of keyword to include in the query sentence to input to the dialog system 1. As a result, the user can arrive at the sought answer more easily. The convenience of the dialog system 1 can be improved.

The processor 10 includes a central processing unit including an electrical circuit (a processing circuit). The first memory 21 and the second memory 22 each include a memory device. The memory device includes, for example, at least one of a hard disk drive (HDD), network-attached storage (NAS), an embedded multimedia card (eMMC), a solid-state drive (SSD), or a solid-state hybrid drive (SSHD). One memory device may function as both the first memory 21 and the second memory 22. The processor 10, the first memory 21, and the second memory 22 may be included in one computer or may be connected to each other via a wired technique, a wireless technique, or a network.

The dialog system 1 according to the embodiment will now be described in detail.

FIG. 2 is a table illustrating a question-answer table.

FIG. 3 is a table illustrating scenario templates.

FIG. 4 is a table illustrating task scenarios.

For example, the first memory 21 stores the question-answer table 110 shown in FIG. 2. The question-answer table 110 includes multiple question-answer pairs 110*a* to 110K. The question-answer pairs 110*a* to 110K respectively include IDs 111*a* to 111K identifying the question-answer pairs, questions 112*a* to 112K, and answers 113*a* to 113K for the questions.

Question keywords 114*a* to 114K are associated respectively with the question-answer pairs 110*a* to 110K. For example, the question keywords 114*a* to 114K are included in the question-answer table 110. Or, the question keywords 114*a* to 114K may be stored separately from the question-answer table 110 in the first memory 21 or another memory.

The question keywords 114*a* to 114K are extracted respectively from the questions 112*a* to 112K. Multiple question keywords may be extracted from one question. For example, the question keywords 114*a* to 114K are extracted from the questions 112*a* to 112K by an external processing device of the dialog system 1. Or, the question keywords 114*a* to 114K may be assigned to the questions 112*a* to 112K by the system administrator.

The question-answer table may include information other than the multiple question-answer pairs and the multiple question keywords. For example, the question-answer table may include a question for which a corresponding answer is not set. The question-answer table may include a combination of one or more questions and one or more answers in which a pair is not formed of one question and one answer. For example, the question-answer table includes a combination of two questions and one answer that is set as a common answer for the two questions. In such cases, for example, the processor 10 performs the dialog with the user based on only the multiple question-answer pairs. The processor 10 does not use the information other than the multiple question-answer pairs for the dialog with the user.

In the question-answer table, one answer may include multiple conditions and a detailed answer for each condition. In such a case, the multiple conditions and the multiple detailed answers can be collectively considered to be one answer.

For example, the second memory 22 stores a generic model 120 shown in FIG. 3. The generic model 120 includes multiple scenario templates 121*a* to 121*c*. The scenario templates 121*a* to 121*c* are used as the base of the task scenarios. The task scenarios include specific information and are used as the responses output from the processor 10. Answer candidate numbers 122a to 122c are set respectively for the scenario templates 121a to 121c. The scenario template to be used is determined according to the answer candidate number.

The scenario templates 121a to 121c are generically written and are independent of the inquiry of the user. Specifically, the scenario templates 121a to 121c each include blanks. As described below, a question, an answer, or a question keyword is plugged into the blanks when generating the task scenario.

The generic model 120 may include a fixed scenario that does not include a blank such as a scenario template 121d. The fixed scenario corresponds to a greeting, thanks, an apology, etc.

The processor 10 includes, for example, an acceptor 11, a setter 12, a selector 13, and a generator 14.

The acceptor 11 accepts the query sentence input from the user. For example, the query sentence is input by an operation of a keyboard, a touch panel, etc., by the user. Or, the query sentence may be generated based on the user speaking. For example, a microphone records the user speaking; and the voice is recognized. The query sentence is generated by automatic speech recognition.

The setter 12 sets the query keywords based on the query sentence. For example, the setter 12 sets the entire query sentence including one or more words as one query keyword. The selector 13 selects one or more question-answer pairs including the query keyword from the question-answer table. The generator 14 generates a task scenario according to the number of selected question-answer pairs. The generator 14 outputs the generated task scenario to an external device such as a monitor, a speaker, a printer, etc. These devices output the task scenario so that the task scenario can be recognized by the user.

As one specific example, Ns of the generic model 120 shown in FIG. 3 is taken to be 3. Ns is set to switch between the responses from the dialog system 1 according to the number of selected question-answer pairs when multiple question-answer pairs are selected. For example, the user inputs "balance confirmation" to the dialog system 1. The acceptor 11 accepts the query sentence. The setter 12 sets the query sentence as the query keyword. In other words, "balance confirmation" is the query keyword. The selector 13 refers to the question-answer table of the first memory 21 and selects the question-answer pairs including the query keyword. The answers that are included in the selected question-answer pairs are the candidates of the answer for the inquiry from the user.

The generator 14 counts the number of selected question-answer pairs. The number of selected question-answer pairs corresponds to the number of answer candidates. Among the questions 112a, 112b, 112c, and 112K of the question-answer table shown in FIG. 2, only the question 112a includes the question keyword "balance confirmation." Accordingly, the number of selected question-answer pairs is 1. The generator 14 refers to the scenario template 121a corresponding to an answer candidate number of 1 in the generic model 120. The generator 14 substitutes "I'd like to confirm the balance of a savings account" of the question 112a into blank 1. The generator 14 substitutes "For balance confirmation, . . . " of the answer 113a into blank 2. Thereby, as shown in FIG. 4, a task scenario 131 of "Your question is, 'I'd like balance confirmation of a savings account.' For balance confirmation, . . . " is generated.

As another example, the user inputs "apply" to the dialog system 1. The setter 12 sets "apply" as the query keyword. In the question-answer table shown in FIG. 2, the two questions of the question 112b and the question 112K include "apply." The number of selected question-answer pairs is 2. The generator 14 refers to a scenario template 121b corresponding to an answer candidate number of 2 in the generic model 120. The generator 14 substitutes "I'd like to apply for a savings account" of the question 112b into blank 3a. The generator 14 substitutes "I'd like to apply for a loan" of the question 112K into blank 3b. Thereby, a task scenario 132 of "Is your question, 'I'd like to apply for a savings account?' Is it 'I'd like to apply for a loan?'" is generated.

As another example, the user inputs "savings account" to the dialog system 1. In the question-answer table shown in FIG. 2, the three questions of the questions 112a, 112b, and 112c include "savings account." The number of selected question-answer pairs is 3. The generator 14 refers to the scenario template 121c corresponding to an answer candidate number of 3 in the generic model 120. Also, the generator 14 extracts, from the question keywords 114a to 114c corresponding respectively to the questions 112a to 112c, question keywords that are different from the query keyword. The generator 14 substitutes the question keyword "balance confirmation" of the question 112a into blank 4a. The generator 14 substitutes the question keyword "apply" of the question 112b into blank 4b. The generator 14 substitutes the question keyword "close" of the question 112c into blank 4c. A task scenario 133 of "Are there additional keywords such as 'balance confirmation,' 'apply,' 'close,' or the like?" is generated thereby.

When the number of selected question-answer pairs is 0, the generator 14 refers to the scenario template 121d corresponding to an answer candidate number of 0 in the generic model 120. The scenario template 121d is a fixed scenario that does not include a blank. The generator 14 sets the task scenario to be the scenario template 121d as-is.

Thus, the processor 10 automatically generates the task scenario based on the generic model 120, the question-answer table 110, and the query sentence input by the user. The generator 14 outputs the generated task scenario as the response to the inquiry of the user.

Figure 5:
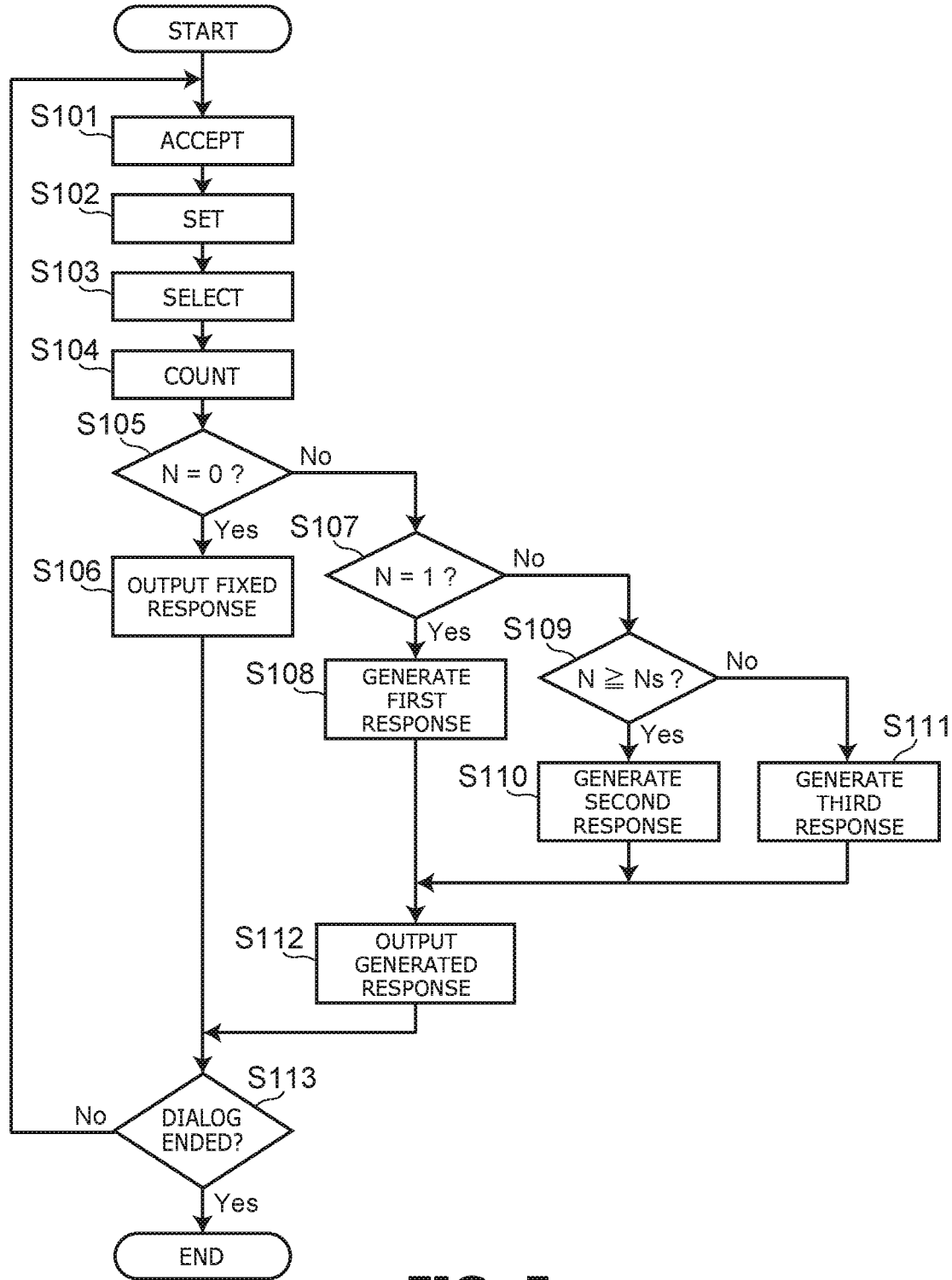
FIG. 5 is a flowchart illustrating the processing of the dialog system according to the embodiment.

FIG. 5 is a flowchart illustrating the processing of the dialog system according to the embodiment.

The acceptor 11 accepts the query sentence input by the user (step S101). The setter 12 sets at least a part of the query sentence as a query keyword (a first query keyword) (step S102). The selector 13 selects the question-answer pairs including the first query keyword (step S103). The generator 14 counts a number N of the selected question-answer pairs (step S104).

The generator 14 determines whether or not N is 0 (step S105). When N is 0, the generator 14 outputs a fixed response (step S106). The fixed response corresponds to the fixed scenario. When N is not 0, the generator 14 determines whether or not N is 1 (step S107). When N is 1, the generator 14 generates the first response (step S108). The first response indicates the answer included in the selected question-answer pair. The first response is, for example, the task scenario 131 shown in FIG. 4.

When N is not 1, the generator 14 determines whether or not N is not less than Ns (step S109). When N is not less than Ns, the generator 14 selects a question keyword (a first question keyword) from one of the selected question-answer pairs that is different from the first query keyword. The generator 14 selects another question keyword (a second question keyword) from another one of the selected question-answer pairs that is different from the first query keyword. The first question keyword and the second question keyword are different from each other. The generator 14 generates the second response including the first question keyword and the second question keyword (step S110). The second response is, for example, the task scenario 133 shown in FIG. 4.

When N is less than Ns, the generator 14 generates a third response including the N questions included respectively in the N question-answer pairs (step S111). For example, the generator 14 generates the third response including a first question included in one of the N question-answer pairs and a second question included in another one of the N question-answer pairs. The third response is, for example, the task scenario 132 shown in FIG. 4. After generating one of the first to third responses, the generator 14 outputs the generated response (step S112).

After outputting the response, the processor 10 determines whether or not the dialog has ended (step S113). For example, the processor 10 measures the elapsed time after the response was output. The processor 10 determines that the dialog has ended when the elapsed time exceeds a threshold without the user inputting another query sentence. A sentence that indicates that the dialog has ended may be input from the user to the dialog system 1. When accepting such a sentence, the processor 10 determines that the dialog has ended. If the acceptor 11 accepts the next query sentence before such conditions of the end are satisfied, the processor 10 re-performs the processing described above.

In the case where the generator 14 outputs the response to a monitor, the generator 14 may output so that the question, the keyword, etc., can be selected on a graphical user interface (GUI) displayed in the monitor. For example, when the generator 14 generates the second response, the output may be performed so that the first question keyword or the second question keyword can be selected on the GUI. When the user clicks the first question keyword or the second question keyword on the GUI, the clicked keyword is input to the processor 10 as the next query sentence. For example, when the generator 14 generates the third response, the output is performed so that the first question or the second question can be selected on the GUI. When the user clicks the first question or the second question on the GUI, the clicked question is input to the processor 10 as the next query sentence.

When multiple question-answer pairs are selected according to the example shown in FIG. 2 to FIG. 5, the second response or the third response is generated according to the number of selected question-answer pairs. The second response includes multiple question keywords that are different from the query keyword. Therefore, the user can know what kind of keyword to include in the next query sentence. The third response includes the multiple questions included in the selected question-answer pairs. Therefore, the user can directly confirm the question included in the selected question-answer pair. By using these responses, the user can arrive at the sought answer more easily.

Modification

Figure 6:
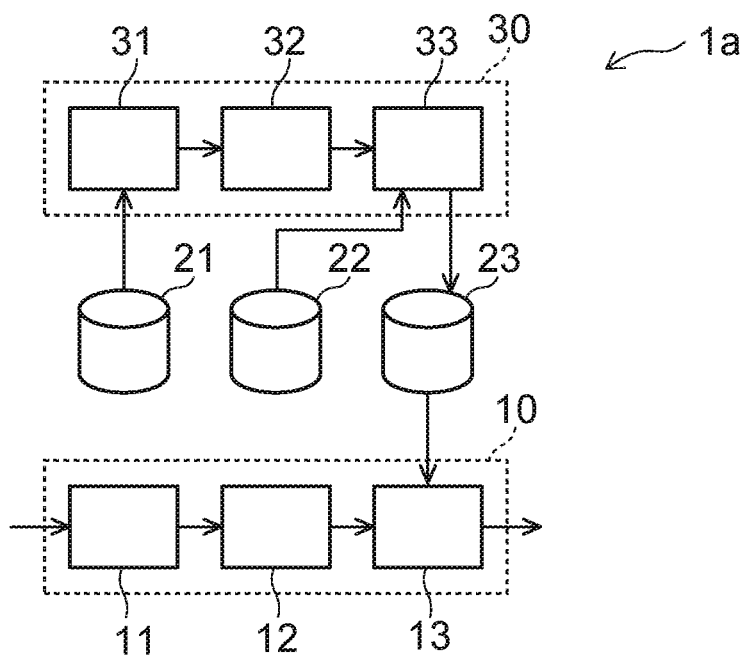
FIG. 6 is a schematic view illustrating a dialog system according to a modification of the first embodiment.

FIG. 6 is a schematic view illustrating a dialog system according to a modification of the first embodiment.

In the dialog system 1a according to the modification, a task model is generated before the inquiry of the user. The task model includes the question keywords included in the question-answer table, the number of question-answer pairs including each question keyword, and multiple task scenarios.

The task model is generated by a processor 30. For example, the dialog system 1a includes the processor 30. The processor 30 stores the generated task model in a third memory 23. The processor 30 includes a central processing unit including an electrical circuit. One device may function as both the processor 10 and the processor 30. The third memory 23 includes a memory device. The memory device includes, for example, at least one of a HDD, NAS, an eMMC, a SSD, or a SSHD. One memory device may function as the first to third memories 21 to 23.

In the dialog system 1a, the processor 30 includes a fetcher 31, an extractor 32, and a generator 33. The processor 10 includes the acceptor 11, the setter 12, and the selector 13.

Figure 7:
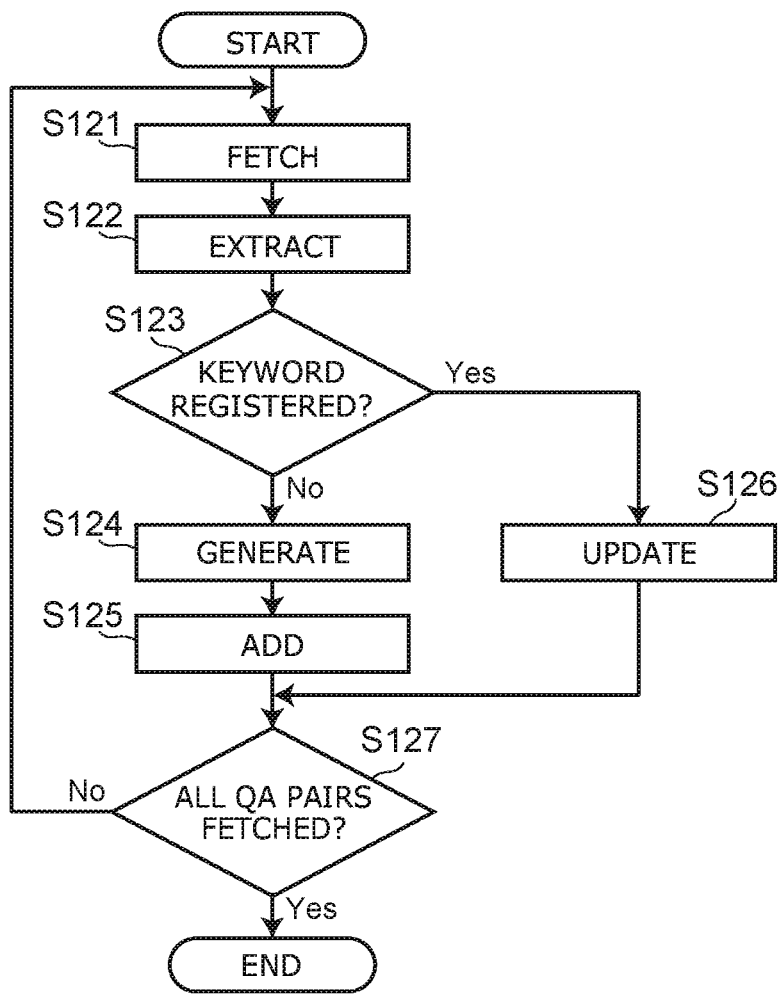
FIG. 7 is a flowchart illustrating the processing of the dialog system according to the modification of the first embodiment.

FIG. 7 is a flowchart illustrating the processing of the dialog system according to the modification of the first embodiment.

The flowchart of FIG. 7 illustrates the processing when generating the task model.

The fetcher 31 refers to the question-answer table of the first memory 21 and fetches one question-answer pair from the multiple question-answer pairs (step S121). The extractor 32 extracts a question keyword registered for the one question-answer pair (step S122). The generator 33 determines whether or not the extracted question keyword is registered in the task model (step S123).

When the extracted question keyword is not registered, the generator 33 refers to the generic model of the second memory 22. The generator 33 searches for the scenario template corresponding to an answer candidate number of 1. The generator 33 generates a task scenario by substituting the question and the answer of the selected question-answer pair respectively into the multiple blanks of the scenario template (step S124). The generator 33 associates the extracted question keyword, the number of question-answer pairs including the question keyword, and the generated task scenario and adds these items to the task model of the third memory 23 (step S125).

When the extracted question keyword is registered in the task model in step S123, the generator 33 updates the task model (step S126). Specifically, the generator 33 adds 1 to the number of question-answer pairs including the extracted question keyword in the task model. After adding 1, the generator 33 compares the number of question-answer pairs to the threshold Ns.

When the number of question-answer pairs is less than Ns, the generator 33 searches for the scenario template corresponding to an answer candidate number of not less than 2 but less than Ns. The generator 33 generates the task scenario by substituting the multiple questions of the multiple question-answer pairs including the extracted question keyword respectively into the multiple blanks of the scenario template.

When the number of question-answer pairs is not less than Ns, the generator 33 extracts other question keywords from the questions included in the question-answer pairs including the extracted question keyword. The generator 33 searches for the scenario template corresponding to an answer candidate number not less than Ns. The generator 33 generates the task scenario by substituting the extracted multiple other question keywords respectively into the multiple blanks of the scenario template. The generator 33 registers the generated task scenario and the updated number of question-answer pairs in the task model.

After step S125 or S126, the processor 30 determines whether or not all of the question-answer pairs have been fetched from the question-answer table (step S127). When an unfetched question-answer pair exists, the processor 30 re-performs step S121. The fetcher 31 fetches another one of the multiple question-answer pairs in step S121. Thereafter, another question keyword is extracted from the other one of the multiple question-answer pairs. The processing of steps S121 to S126 is repeated until all of the question-answer pairs included in the question-answer table are fetched.

Figure 8:
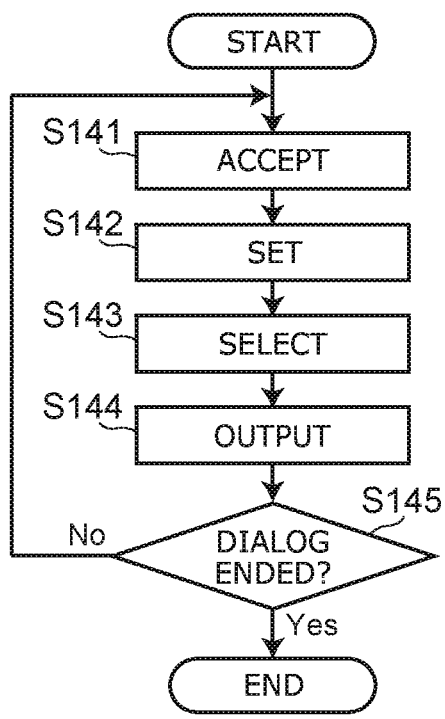
FIG. 8 is a flowchart illustrating the processing of the dialog system according to the modification of the first embodiment.

FIG. 8 is a flowchart illustrating the processing of the dialog system according to the modification of the first embodiment.

The flowchart of FIG. 8 illustrates the processing when responding to the query sentence.

The acceptor 11 accepts the query sentence input by the user (step S141). The setter 12 sets the query sentence as the query keyword (step S142). The selector 13 selects the response based on the query keyword (step S143). Specifically, the selector 13 accesses the third memory 23. The selector 13 determines whether or not the task model includes the query keyword.

When the task model includes the query keyword, the selector 13 selects the task scenario associated with the query keyword from the task model. When the query keyword is not included in the task model, the selector 13 selects, as the task scenario, the scenario template (the fixed scenario) corresponding to the answer candidate number of 0 from the generic model of the second memory 22. The scenario template that corresponds to the answer candidate number of 0 may be pre-registered in the task model as the task scenario. The selector 13 outputs the selected response (step S144). The processor 10 determines whether or not the dialog has ended (step S145).

According to the dialog system 1a according to the modification, the processor 10 generates the task model including the multiple task scenarios before accepting the query sentence. Therefore, it is unnecessary for the processor 10 to generate the task scenario based on the query sentence after accepting the query sentence. For example, the processing load of the processor 10 after accepting the query sentence can be reduced.

Second Embodiment

Figure 9:
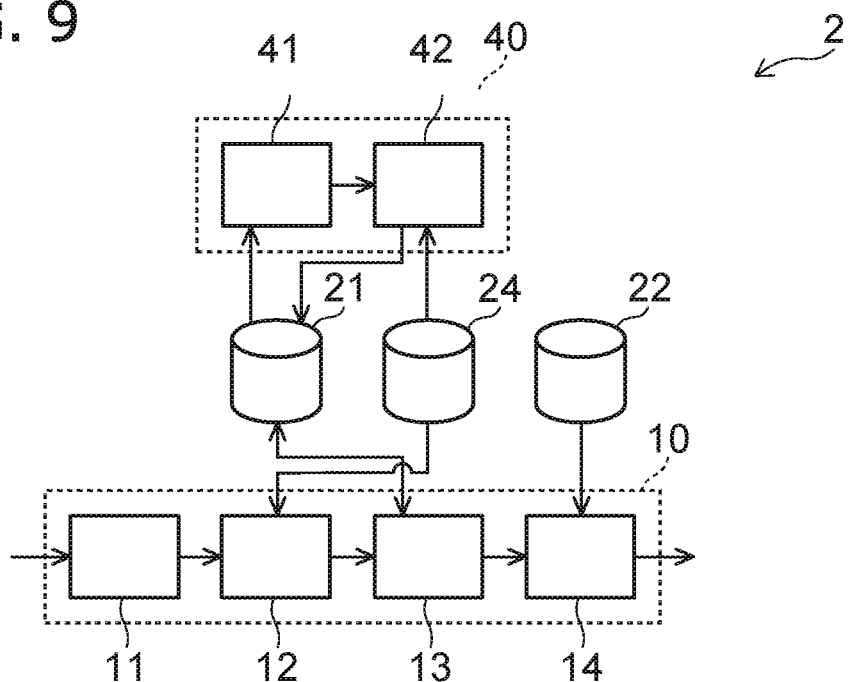
FIG. 9 is a schematic view illustrating a dialog system according to a second embodiment.

FIG. 9 is a schematic view illustrating a dialog system according to a second embodiment.

In the dialog system 2 according to the second embodiment, the processor 10 refers to a fourth memory 24 in addition to the first memory 21 and the second memory 22 when generating the response. The dialog system 2 may include the fourth memory 24. The fourth memory 24 stores a model or rules for extracting keywords from a sentence.

The dialog system 2 further includes a processor 40. The processor 40 includes, for example, a fetcher 41 and an extractor 42. The fetcher 41 accesses the first memory 21 and fetches one question-answer pair from the question-answer table. The extractor 42 extracts question keywords from the question-answer pair according to the model or the rules stored in the fourth memory 24. For example, the extractor 42 stores the extracted question keywords in the first memory 21. The processor 40 includes a central processing unit including an electrical circuit. One device may function as both the processor 10 and the processor 40. The fourth memory 24 includes a memory device. The memory device includes, for example, at least one of a HDD, NAS, an eMMC, a SSD, or a SSHD. One memory device may function as the first memory 21, the second memory 22, and the fourth memory 24.

When the acceptor 11 accepts the query sentence including one or more words, the setter 12 extracts a part of the one or more words according to the model or the rules stored in the fourth memory 24. The setter 12 sets the extracted word as the query keyword. In other words, the setter 12 extracts the query keyword from the query sentence. Multiple query keywords may be extracted from the query sentence.

For example, the extraction of the keywords is based on the part of speech of each word included in the sentence. In such a case, the fourth memory 24 stores a morphological analysis model or morphological analysis rules. By performing morphological analysis of the sentence, the setter 12 splits the sentence into multiple words and estimates the part of speech of each word. The setter 12 sets the words of designated parts of speech as the keywords. For example, nouns and verbs are used as the designated parts of speech. For a compound noun which is one type of noun, the setter 12 may register each noun inside the compound noun as a keyword, may register the entire compound noun as one keyword, or may register using a combination of these techniques. Also, the setter 12 may extract, as a keyword, a word (an unknown word) that cannot be classified as any part of speech.

Figure 10:
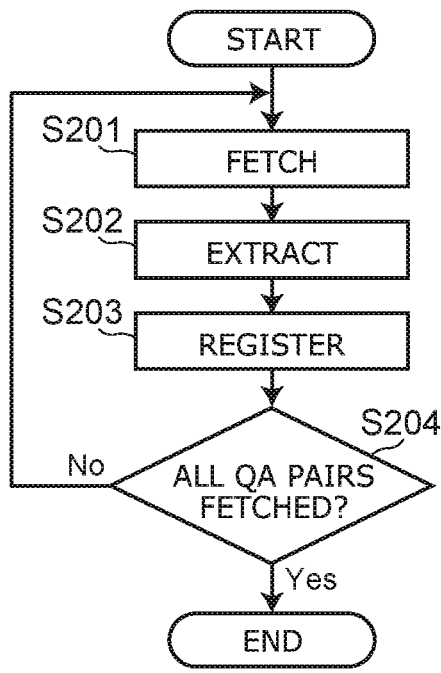
FIG. 10 is a flowchart illustrating the processing of the dialog system according to the second embodiment.

FIG. 10 is a flowchart illustrating the processing of the dialog system according to the second embodiment.

FIG. 10 shows the processing when the processor 40 extracts the question keywords from the question-answer table. For example, the processing shown in FIG. 10 is performed when the user inputs the query sentence.

The fetcher 41 fetches one of the multiple question-answer pairs from the question-answer table (step S201). The extractor 42 extracts question keywords from the questions of the fetched question-answer pairs (step S202). The extractor 42 registers the extracted question keywords in the first memory 21 (step 203). The fetcher 41 determines whether or not all of the question-answer pairs included in the question-answer table have been fetched (step S204). When an unfetched question-answer pair exists, the fetcher 41 re-performs step S201. In step S201, the fetcher 41 fetches another one of the multiple question-answer pairs from the question-answer table. Thereafter, another question keyword is extracted from the other one of the multiple question-answer pairs. The processing of steps S201 to S203 is repeated until the question keywords are extracted from all of the question-answer pairs included in the question-answer table.

The processor 10 performs processing similar to the flowchart shown in FIG. 5 by using the question keywords extracted from the question-answer table. For example, in step S102, the setter 12 extracts a part of the query sentence input by the user and sets the part as one or more query keywords. In step S103, the selector 13 selects the question-answer pairs including at least one of the extracted one or more query keywords.

According to the second embodiment, a part of the query sentence is extracted and set as the query keyword. According to this method, compared to the case where the entire query sentence is set as one query keyword, the question-answer pairs that include questions corresponding to the inquiry of the user are selected more easily. Thereby, the user can arrive at the sought answer more easily. The convenience of the dialog system 2 can be improved.

According to the second embodiment, the question keywords are extracted from the question-answer table when the user inputs the query sentence. Therefore, even if the question-answer table is updated frequently, the question-answer pair is selected based on the question keywords included in the latest question-answer table. For example, the response can be output using the question keywords included in the latest question-answer table. Thereby, the user can arrive at the sought answer more easily.

In step S103, in addition to the question-answer pairs including the same question keyword as the query keyword, the selector 13 may select a question-answer pair including a question keyword similar to the query keyword. The selector 13 calculates the similarity between each of the one or more query keywords and each of the multiple question keywords extracted from the question-answer table. When the similarity between one query keyword and one question keyword is not less than a preset threshold, the one query keyword is determined to be a paraphrase of the one question keyword. The selector 13 determines the question-answer pair including the question keyword similar to the query keyword to substantially include the query keyword, and selects that question-answer pair.

For example, the reading of one question keyword is the same as the reading of one query keyword. As an example, at least a part of the question keyword is written using one of hiragana or katakana; and at least a part of the query keyword is written using the other of hiragana or katakana. In such a case, the question keyword is a paraphrase of the query keyword. As another example, the question keyword and the query keyword include the same kanji but include different declensional kana. Even in such a case, the question keyword is a paraphrase of the query keyword.

Also, when the question keyword and the query keyword include the same kanji but have different declensional kana due to different parts of speech, the question keyword is determined to be a paraphrase of the query keyword. For example, when the question keyword is "furikomi (a transfer)" and the query keyword is "furikomu (to transfer)," the question keyword is determined to be a paraphrase of the query keyword.

For example, the edit distance is used to determine the similarity. The selector 13 sets the edit distance between the keywords as the similarity.

The similarity may be determined using a pre-generated paraphrase dictionary. The paraphrase dictionary includes sets of multiple keywords. Each set includes multiple keywords. The multiple keywords that are included in each set are paraphrases that are similar to each other. For example, the selector 13 sets the similarity between the keywords included in one set to be 1, and otherwise sets the similarity between the keywords to be 0. The similarity may be determined using a pre-trained distributed representation model. A distributed representation of words is described in the distributed representation model. The selector 13 determines the similarity based on the distance or the cosine similarity between the vectors of the keywords.

By selecting question-answer pairs including question keywords similar to the query keyword, the question-answer pair that includes the question corresponding to the inquiry of the user is selected more easily. Thereby, the user can arrive at the sought answer more easily.

Figure 11:
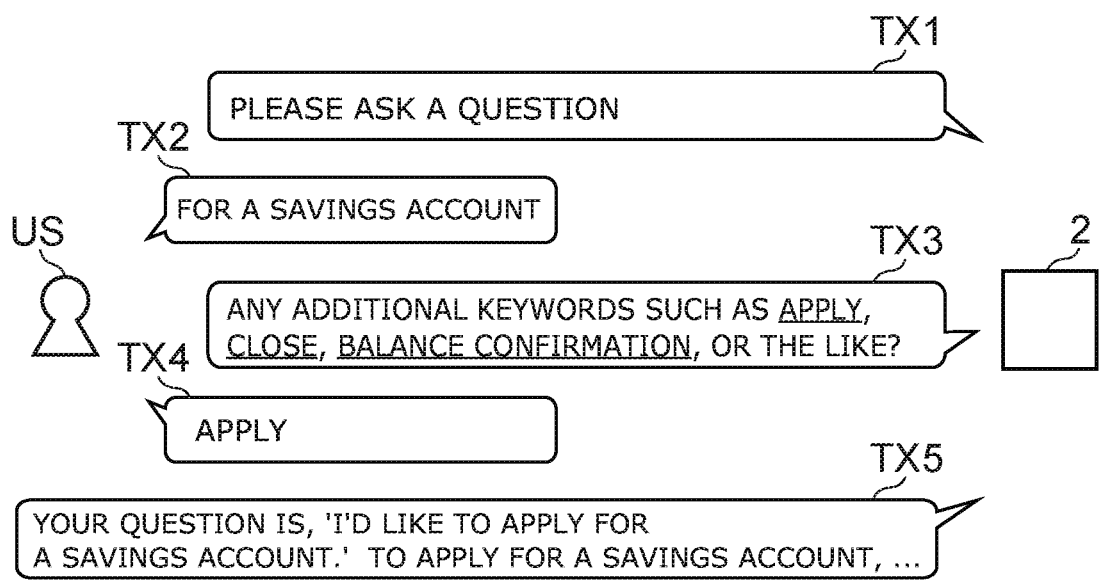
FIG. 11 is a schematic view showing the operation of the dialog system according to the second embodiment.

FIG. 11 is a schematic view showing the operation of the dialog system according to the second embodiment.

FIG. 11 shows a dialog between a user US and the dialog system 2. For example, when detecting the user US, the dialog system 2 outputs a sentence TX1 of "Please ask a question." The user US inputs a sentence TX2 of "For a savings account" to the dialog system 2. The dialog system 2 disassembles the sentence TX2 (the query sentence) into multiple words and estimates the part of speech of each word. Based on the parts of speech, the dialog system 2 extracts "savings account" from the sentence TX2 as a query keyword. The dialog system 2 selects, from the question-answer table, the question-answer pairs in which "savings account" is registered as a question keyword.

As an example, the dialog system 2 selects three question-answer pairs, i.e., the question-answer pair including the question keywords "savings account" and "apply," the question-answer pair including the question keywords "savings account" and "close," and the question-answer pair including the question keywords "savings account" and "balance confirmation." Based on the selection result, the dialog system 2 outputs a sentence TX3 of "Any additional keywords such as apply, close, balance confirmation, or the like?." The sentence TX3 corresponds to the second response.

In the sentence TX3, the words that correspond to the question keywords may be output to be discriminable from the other words. For example, in the case where the response output from the dialog system 2 is displayed on a monitor, the words that correspond to the question keywords are displayed in bold type, underlined, or colorized compared to the other words. The words that correspond to the question keywords may be displayed to be clickable. When the user US clicks a word corresponding to a question keyword, the next sentence that includes the question keyword may be input automatically to the dialog system 2. In the case where the response output from the dialog system 2 is output as a voice, the words that correspond to the question keywords are read aloud slowly or loudly compared to the other words.

Based on the sentence TX3, the user US inputs a sentence TX4 of "apply" to the dialog system 2. Based on the sentence TX4, the dialog system 2 sets "apply" as the query keyword. Using the query keyword based on the sentence TX4, the dialog system 2 further selects a part of the previously-selected question-answer pair. For example, the query keyword "apply (kanji)" based on the sentence TX4 is similar to the question keyword "apply (kanji+hiragana)," The dialog system 2 selects, from the three question-answer pairs recited above, the question-answer pair including the question keywords "savings account" and "apply." Because the number of question-answer pairs is narrowed down to 1, the dialog system 2 outputs a sentence TX5 of "Your question is 'I'd like to apply for a savings account.' To apply for an account, . . . " to indicate the answer included in the question-answer pair. The sentence TX5 corresponds to the first response.

When extracting the question keywords from the question-answer table, the extractor 42 may determine a score indicating the importance of each question keyword. The selector 13 selects the question-answer pair based on the score.

The score of the question keyword is set to be higher for a fewer number of question-answer pairs including the question keyword. Keywords having high scores are not numerous in the question-answer table and are useful to select the question-answer pair. The setter 12 determines the score of each question keyword using a technique such as the appearance frequency in the question-answer table, the inverse document frequency in the question-answer table, BM25, etc. For example, the setter 12 calculates the proportion of the number of question-answer pairs including the question keyword to the total number of question-answer pairs included in the question-answer table. The setter 12 uses the reciprocal of the proportion (the inverse document frequency) as the score. Or, the setter 12 may set a numerical value set based on the proportion as the score. For example, the setter 12 may convert the reciprocal of the proportion using a logarithmic function and may use the obtained numerical value as the score.

As one specific example, the question-answer table is taken to include the four question-answer pairs 110a, 110b, 110c, and 110K as shown in FIG. 2. In the question-answer table, three question-answer pairs include "savings account." The score of "savings account" is set to 4/3 which is the reciprocal of 3/4. Similarly, the score of "balance confirmation" is set to 4/1 which is the reciprocal of 1/4. The score of "apply" is set to 4/2 which is the reciprocal of 2/4.

When selecting the question-answer pairs including the query keyword, the selector 13 refers to the score of the question keyword corresponding to the query keyword in each selected question-answer pair. The score that is set to the question keyword corresponding to the query keyword is assigned to the question-answer pair including the question keyword. The selector 13 calculates the total scores for all of the question-answer pairs. The selector 13 selects, from the question-answer pairs including the query keyword, the question-answer pairs of which the total score exceeds the threshold (the second threshold). The generator 14 generates the response according to the number of question-answer pairs of which the total score exceeds the threshold.

For example, the setter 12 sets a part of the query sentence input by the user as the first query keyword, and sets another part of the query sentence as a second query keyword. The selector 13 assigns the score set to the question keyword corresponding to the first query keyword to one or more question-answer pairs including the question keyword. The selector 13 assigns the score set to another question keyword corresponding to the second query keyword to one or more question-answer pairs including the other question keyword. The selector 13 selects one or more question-answer pairs of which the assigned score exceeds the threshold.

The number of question-answer pairs can be narrowed down by selecting the question-answer pairs based on the scores. Also, by selecting based on the scores, the answer that is sought by the user can be suppressed from being dropped from the selection. Therefore, the user can arrive at the sought answer more easily.

The processor 10 may determine whether or not the query sentence is a negative sentence. For example, when setting the query keyword, the setter 12 determines whether or not the query sentence is a negative sentence. When the setter 12 determines that the query sentence is a negative sentence, the selector 13 selects question-answer pairs that do not include the query keyword.

For example, after the dialog system 2 outputs the sentence TX3, the user inputs the query sentence of "Not 'close' or 'balance confirmation.'" The setter 12 extracts "close" and "balance confirmation" as query keywords from the query sentence. Further, the setter 12 determines that the query sentence is a negative sentence. Based on the determination result, the selector 13 selects, from the three previously-selected question-answer pairs, the question-answer pairs not including the question keywords "close" and "balance confirmation." As a result, the dialog system 2 outputs the sentence TX5.

To determine whether or not the query sentence is a negative sentence, for example, the setter 12 refers to pre-generated rules. As an example, a rule is recited as, "The query sentence is a negative sentence when 'not,' 'non,' or 'other than' are included in the query sentence." The setter 12 determines whether or not the query sentence is a negative sentence by determining whether the query sentence satisfies the conditions recited in the rules.

The setter 12 may refer to a pre-generated model. For example, the model is an artificial neural network model or a recurrent neural network model. The model is pre-trained using training data. The training data includes multiple paired data. Each paired data includes a sentence and information indicating that the sentence is the negative form. The model is trained to output information indicating a negative sentence when a negative sentence is input.

Modification

Figure 12:
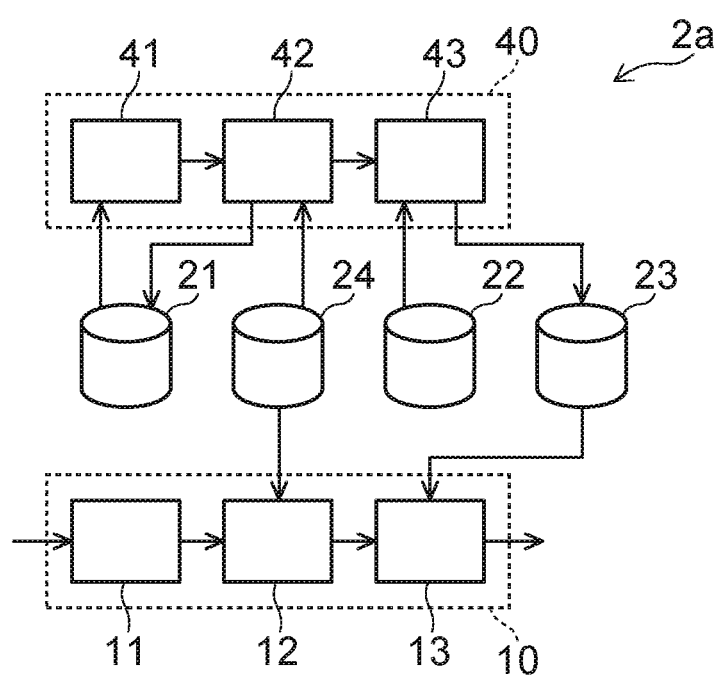
FIG. 12 is a schematic view illustrating a dialog system according to a modification of the second embodiment.

FIG. 12 is a schematic view illustrating a dialog system according to a modification of the second embodiment.

In the dialog system 2a according to the modification, a task model is generated before the inquiry of the user. The task model is generated by the processor 40. For example, the dialog system 2a includes the processor 40. The processor 40 stores the generated task model in the third memory 23.

In the dialog system 2a, the processor 40 includes the fetcher 41, the extractor 42, and a generator 43. The processor 10 includes the acceptor 11, the setter 12, and the selector 13.

The fetcher 41 accesses the first memory 21 and fetches one question-answer pair from the question-answer table. The extractor 42 extracts question keywords from the question-answer pair according to the model or the rules stored in the fourth memory 24. For example, the extractor 42 stores the extracted question keywords in the first memory 21. The generator 43 generates a task scenario based on the extracted question keywords and updates the task model. The processing by the generator 43 is similar to steps S123 to S126 of the flowchart shown in FIG. 7.

By using the task model, the processor 10 outputs the response to the query sentence input by the user. The processing of the processor 10 of the dialog system 2a is similar to the flowchart shown in FIG. 8.

According to the dialog system 2a according to the modification, similarly to the dialog system 1a, the task model that includes the multiple task scenarios is generated before the processor 10 accepts the query sentence. Therefore, for example, the processing load of the processor 10 after accepting the query sentence can be reduced.

In the dialog system 2a, the extractor 42 may determine the score indicating the importance of each question keyword when extracting the question keywords from the question-answer table. The selector 13 selects the task scenario from the task model based on the score.

As an example, the setter 12 extracts two query keywords (the first query keyword and the second query keyword) from the query sentence input by the user. The task model includes a task scenario including the first question keyword corresponding to the first query keyword, and a task scenario including the second question keyword corresponding to the second query keyword. The task model does not include a task scenario including both the first question keyword and the second question keyword.

In the example, when selecting one task scenario, the selector 13 compares the score of the first question keyword and the score of the second question keyword. The selector 13 selects the task scenario including the question keyword having the higher score. The selector 13 outputs the selected task scenario as the response.

FIG. 13 is a schematic view describing the operation of the dialog system according to the second embodiment.

The upper level of FIG. 13 illustrates the dialog between the user and the dialog system. The middle level of FIG. 13 illustrates the question-answer table. The lower level of FIG. 13 illustrates the task model.

The question-answer table includes, for example, the six question-answer pairs shown in FIG. 13. Each question includes the question keyword of one of "Internet banking," "overseas" or "transfer money." The question-answer table does not include a question including all of "Internet banking," "overseas," and "transfer money." In such a case, the processor 40 generates a task scenario corresponding to the question keyword "Internet banking," a task scenario corresponding to the question keyword "overseas," and a task scenario corresponding to the question keyword "transfer money."

To generate the task scenarios, the extractor 42 determines the score of each question keyword when extracting the question keywords from the question-answer table. In the example of FIG. 13, two questions (answer candidates) include "Internet banking." Three questions include "overseas." One question includes "transfer money." The number of questions including each query keyword compared to the number of selected question-answer pairs (6) is used as the score. The score of "Internet banking" is 6/2. The score of "overseas" is 6/3. The score of "transfer money" is 6/1.

As shown in FIG. 13, the user US inputs "Can I transfer money overseas by Internet banking?" to the dialog system 2a. From the query sentence, the setter 12 extracts "Internet banking," "overseas," and "transfer money" as query keywords. The selector 13 extracts, from the task model, a task scenario generated according to the question keyword of one of "Internet banking," "overseas," or "transfer money."

The selector 13 outputs one of the multiple task scenarios as the response. The selector 13 compares the score of the question keyword corresponding to each task scenario to select the one task scenario from the multiple task scenarios. As a result of the comparison of the scores, the score of "transfer money" is determined to be the highest. The selector 13 outputs the task scenario corresponding to "transfer money" as the response.

Figure 14:
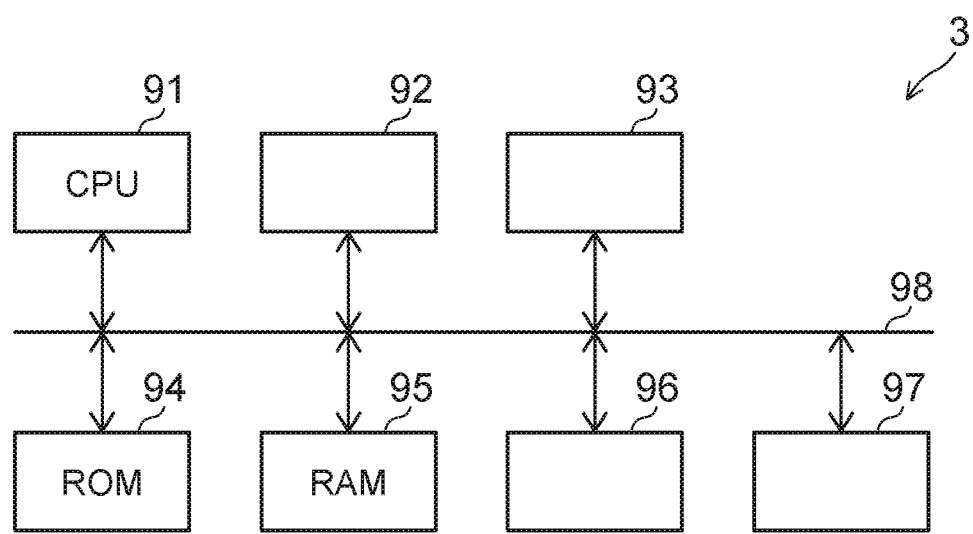
FIG. 14 is a schematic view illustrating the configuration of a dialog device according to the embodiment.

FIG. 14 is a schematic view illustrating the configuration of a dialog device according to the embodiment.

For example, the dialog systems according to the embodiments described above are realized using the dialog device 3 shown in FIG. 14. As an example, the dialog device 3 is realized using a hardware configuration similar to a general computer (information processing device). The dialog device 3 includes a CPU (Central Processing Unit) 91, an inputter 92, an outputter 93, ROM (Read Only Memory) 94, RAM (Random Access Memory) 95, memory 96, a communication device 97, and a bus 98. The components are connected by the bus 98.

The CPU 91 performs various processing in cooperation with various programs pre-stored in the ROM 94 or the memory 96 and comprehensively controls the operations of the components included in the dialog device 3. In the processing, the CPU 91 uses a prescribed region of the RAM 95 as a work region. The CPU 91 realizes the inputter 92, the outputter 93, the communication device 97, etc., in cooperation with programs pre-stored in the ROM 94 or the memory 96.

The inputter 92 includes, for example, at least one of a keyboard, a microphone, or a touch panel. The inputter 92 accepts the information input from the user as an instruction signal and outputs the instruction signal to the CPU 91. The outputter 93 includes, for example, at least one of a monitor, a speaker, or a printer. The outputter 93 outputs various information based on the signals output from the CPU 91.

The ROM 94 non-reprogrammably stores programs used to control the dialog device 3, various setting information, etc. The RAM 95 is a volatile storage medium such as SDRAM (Synchronous Dynamic Random Access Memory), etc. The RAM 95 functions as a work region of the CPU 91. Specifically, the RAM 95 functions as a buffer that temporarily stores various variables, parameters, etc., used by the dialog device 3, etc.

The memory 96 is a rewritable recording device such as a storage medium using a semiconductor such as flash memory or the like, a magnetically or optically recordable storage medium, etc. The memory 96 stores programs used to control the dialog device 3, various setting information, etc. The memory 96 functions as the first to fourth memories 21 to 24. The communication device 97 is used to transmit and receive information by communicating with external devices.

The embodiments may include the following aspects.

Aspect 1

A program, causing a processor to set, when a first sentence including one or more words is input by a user, at least a part of the one or more words as a first query keyword, select, from a question-answer table including multiple question-answer pairs, one or more of the question-answer pairs including the first query keyword, each question-answer pair including a question and an answer to the question, output, when a number of the selected question-answer pairs is 1, a first response indicating the answer included in the selected question-answer pair, and output, when the number is not less than a first threshold, a second response including a first question keyword and a second question keyword, the first question keyword being extracted from multiple question keywords included in one of the selected question-answer pairs, the second question keyword being extracted from other multiple question keywords included in another one of the selected question-answer pairs.

Aspect 2

A storage medium storing the program of Aspect 1.

According to the embodiments described above, a dialog system capable of a dialog with a user can be configured more easily. According to the embodiments, a dialog system, a dialog method, a program, and a storage medium can be provided in which the user arrives at the sought answer more easily.

For example, the processing of the various data recited above is performed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in dialog systems such as processors, memories, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all dialog systems, dialog methods, programs, and storage mediums practicable by an appropriate design modification by one skilled in the art based on the dialog systems, the dialog methods, the programs, and the storage mediums described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A dialog system, comprising a processor,
when a first sentence including one or more words is input by a user, the processor setting at least a part of the one or more words as a first query keyword,
the processor selecting, from a question-answer table including a plurality of question-answer pairs, one or more of the question-answer pairs including the first query keyword, each question-answer pair including a question and an answer to the question,
when a number of the selected question-answer pairs is 1, the processor outputting a first response indicating the answer included in the selected question-answer pair, and
when the number is not less than a first threshold, the processor outputting a second response including a first question keyword and a second question keyword, the first question keyword being extracted from a plurality of question keywords included in one of the selected question-answer pairs, the second question keyword being extracted from another plurality of question keywords included in another one of the selected question-answer pairs, wherein
the processor generates the first response and the second response using a plurality of scenario templates,
each of the plurality of scenario templates includes a blank,
when generating the first response, the processor plugs the answer included in the selected question-answer into the blank of one of the plurality of scenario templates, and
when generating the second response, the processor plugs the first question keyword and the second question keyword respectively into the blanks of another one of the plurality of scenario templates.

2. The system according to claim 1, wherein when accepting, after the outputting of the second response, a second sentence including one of the first question keyword or the second question keyword, the processor outputs a response indicating the answer included in the question-answer pair including the one of the first question keyword or the second question keyword.

3. The system according to claim 1, wherein
the first threshold is 3 or more, and
when the number is not less than 2 but less than the first threshold, the processor outputs a third response including a plurality of the questions included respectively in the selected question-answer pairs.

4. The system according to claim 1, wherein in the selecting of the question-answer pair,
the processor extracts, from a plurality of question keywords included in a plurality of the questions of the question-answer table, a first similar keyword similar to the first query keyword, the extracting being based on similarities respectively between the first query keyword and the plurality of question keywords, and
the processor selects, from the question-answer table, one or more of the question-answer pairs including at least one of the first query keyword or the first similar keyword.

5. The system according to claim 1, wherein in the setting of the first query keyword,
the processor splits the first sentence into the one or more words,
the processor estimates a part of speech for each of the one or more words, and
the processor sets, as the first query keyword, one of a verb, a noun, or an unknown word included in the one or more words.

6. A dialog system, comprising a processor,
when a first sentence including a plurality of words is input by a user, the processor setting, as a first query keyword, a part of the plurality of words and setting, as a second query keyword, another part of the plurality of words,
the processor referring to a first memory, the first memory storing a question-answer table including a plurality of question-answer pairs, each question-answer pair including a question and an answer to the question, scores being set respectively for a plurality of question keywords included in a plurality of the questions, the processor assigning, to one or more of the question-answer pairs including one of the plurality of question keywords corresponding to the first query keyword, the score set for the one of the plurality of question keywords, the processor assigning, to one or more of the question-answer pairs including another one of the plurality of question keywords corresponding to the second query keyword, the score set for the other one of the plurality of question keywords, the processor selecting one or more of the question-answer pairs having assigned scores exceeding a second threshold, when a number of the selected question-answer pairs is 1, the processor outputting a first response indicating the answer included in the selected question-answer pair, and when the number is not less than a first threshold, the processor outputting a second response including a first question keyword and a second question keyword, the first question keyword being extracted from a plurality of question keywords included in one of the selected question-answer pairs, the second question keyword being extracted from a plurality of other question keywords included in another one of the selected question-answer pairs, wherein the processor generates the first response and the second response using a plurality of scenario templates, each of the plurality of scenario templates includes a blank, when generating the first response, the processor plugs the answer included in the selected question-answer into the blank of one of the plurality of scenario templates, and when generating the second response, the processor plugs the first question keyword and the second question keyword respectively into the blanks of another one of the plurality of scenario templates.

7. A dialog method, comprising:

when a first sentence including one or more words is input by a user, setting at least a part of the one or more words as a first query keyword;

selecting, from a question-answer table including a plurality of question-answer pairs, one or more of the question-answer pairs including the first query keyword, each question-answer pair including a question and an answer to the question;

when a number of the selected question-answer pairs is 1, outputting a first response indicating the answer included in the selected question-answer pair; and when the number is not less than a first threshold, outputting a second response including a first question keyword and a second question keyword, the first question keyword being extracted from a plurality of question keywords included in one of the selected question-answer pairs, the second question keyword being extracted from another plurality of question keywords included in another one of the selected question-answer pairs, wherein the first response and the second response are generated using a plurality of scenario templates, each of the plurality of scenario templates includes a blank, when the first response is generated, the answer included in the selected question-answer is plugged into the blank of one of the plurality of scenario templates, and when the second response is generated, the first question keyword and the second question keyword are respectively plugged into the blanks of another one of the plurality of scenario templates.

* * * * *